US 6,669,289 B1

(12) United States Patent  
Hays

(10) Patent No.: US 6,669,289 B1
(45) Date of Patent: Dec. 30, 2003

(54) INFANT SEAT WITH A SHOPPING CART SYSTEM

(76) Inventor: Jennifer L. Hays, 7818 Centerville Rd., Tallahassee, FL (US) 32309

(*) Notice: Subject to any disclaimer, the term of this patent is extended or adjusted under 35 U.S.C. 154(b) by 0 days.

(21) Appl. No.: 10/428,493

(22) Filed: May 2, 2003

(51) Int. Cl.[7] .................................................. A47C 1/08
(52) U.S. Cl. ................................................ 297/256.17
(58) Field of Search ........................ 247/250.1, 256.17, 247/228.11, 217.1; 280/33.993

(56) References Cited

U.S. PATENT DOCUMENTS

| 794,145 | A | * | 7/1905 | Ellington et al. |
| 2,813,725 | A | * | 11/1957 | Hoedinghaus et al. |
| 2,890,057 | A | * | 6/1959 | Davis |
| 4,718,721 | A | * | 1/1988 | Pompa |
| 5,678,888 | A | * | 10/1997 | Sowell et al. |
| 6,129,418 | A | * | 10/2000 | Bergh et al. |
| 6,224,152 | B1 | * | 5/2001 | Hughes et al. |
| 6,237,998 | B1 | * | 5/2001 | Aprile |
| 6,517,155 | B1 | * | 2/2003 | Landine |

* cited by examiner

Primary Examiner—Milton Nelson, Jr.
(74) Attorney, Agent, or Firm—Edward P. Dutkiewicz

(57) ABSTRACT

An infant seat includes base, front, rear, and side panels. A box-like region provides for the receipt of an infant. The box-like region is enclosed at its lower extent to form a lower periphery and at its upper extent to form an upper periphery. The upper periphery is greater than the lower periphery. A tubular hem is formed in the upper periphery. An elastic band is located within the hem. The upper periphery is rolled over into a scroll-like cross section to preclude an infant within the infant seat from touching the shopping cart. Large apertures are provided in the rear panel for the passage of the legs of an infant within the infant seat. Small vertical slits are provided in the front panel for the passage of the seat belt. The seat belt provides for the removable retention of an infant within the infant seat.

5 Claims, 3 Drawing Sheets

INFANT SEAT WITH A SHOPPING CART SYSTEM

BACKGROUND OF THE INVENTION

1. Field of the Invention

The present invention relates to an infant seat with a shopping cart system and more particularly pertains to supporting an infant in a safe, sanitary and comfortable manner while grocery shopping.

2. Description of the Prior Art

The use of shopping carts and seats of known designs and configurations is known in the prior art. More specifically, shopping carts and seats of known designs and configurations previously devised and utilized for the purpose of supporting infants through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,666,207 to Quartano relates to device for cushioning a shopping cart to a seat. U.S. Pat. No. 4,655,502 to Houllis relates to a cushion for a shopping cart seat. U.S. Pat. No. 6,206,471 to McGowan relates to a shopping cart seat. Lastly, U.S. Pat. No. 6,036,264 to Lucree relates to an antibacterial liner for a shopping cart seat.

While these devices fulfill their respective, particular objectives and requirements, the aforementioned patents do not describe an infant seat with a shopping cart system that allows supporting an infant in a safe, sanitary and comfortable manner while grocery shopping.

In this respect, the infant seat with a shopping cart system according to the present invention substantially departs from the conventional concepts and designs of the prior art, and in doing so provides an apparatus primarily developed for the purpose of supporting an infant in a safe, sanitary and comfortable manner while grocery shopping.

Therefore, it can be appreciated that there exists a continuing need for a new and improved infant seat with a shopping cart system which can be used for supporting an infant in a safe, sanitary and comfortable manner while grocery shopping. In this regard, the present invention substantially fulfills this need.

SUMMARY OF THE INVENTION

In view of the foregoing disadvantages inherent in the known types of shopping carts and seats of known designs and configurations now present in the prior art, the present invention provides an improved infant seat with a shopping cart system. As such, the general purpose of the present invention, which will be described subsequently in greater detail, is to provide a new and improved infant seat with a shopping cart system and method which has all the advantages of the prior art and none of the disadvantages.

To attain this, the present invention essentially comprises a shopping cart. The shopping care has a basket. The basket is for the receipt of groceries. The basket is fabricated of wire. The basket has an essentially horizontal floor. The floor of the basket has a narrow front face. The floor of the basket has a wide rear face. The floor of the basket has tapering sides between the front and rear faces. The shopping care has wheels. The wheels are provided beneath the shopping cart. The shopping cart has a handle. The handle is provided above the shopping cart and adjacent to the rear face.

A sitting area is provided in the basket. The sitting area is formed of a pivotable backrest. The sitting area has a top. The top is spaced a short distance from the rear face. The sitting area has a generally horizontal seat. The seat is provided between the backrest and the rear face. The sitting area is bounded on its side by the sides of the basket. The sitting area includes apertures. The apertures are provided in the back face above the seat. In this manner legs of an infant may pass within the sitting area. A seat belt is provided. The seat belt is attached to the top of the backrest. The seat belt is attached with a buckle. In this manner an infant may be releasable retained with respect to the sitting area.

Provided next is an infant seat. The infant seat is fabricated of a soft quilted material. The seat includes a base panel. The base panel has a trapezoidal periphery. The base panel has a narrow front edge. The base panel has a wide rear edge. The base panel has tapering side edges between the front and rear edges. The seat includes a front panel. The seat also includes a rear panel. The seat further includes side panels between the front and rear panels. The front, rear, and side panels have upper edges, lower edges, and side edges. The edges have generally horizontal stitching. The horizontal stitching couples the lower edges to the periphery of the base panel. The edges have generally vertical stitching. The vertical stitching couples together the side edges into a box-like region. In this manner an infant may be received. The box-like region is enclosed at its lower extent by the lower edges of the front and rear and side panels. In this manner a lower periphery is formed. The box-like region is enclosed at its upper extent by the upper edges of the front and rear and side panels. In this manner an upper periphery is formed. The upper periphery is greater than the lower periphery.

A tubular hem is provided next. The tubular hem is formed in the upper periphery. The tubular hem is formed with an elastic band. The elastic band is located within the hem. The upper periphery is rolled over into a scroll-like cross section. The upper periphery is positioned generally above and exterior of the upper edges of the handle, the backrest, and the sides of the basket. In this manner an infant within the infant seat is precluded from touching the shopping cart.

Further provided are large generally rectangular apertures. The apertures are provided in the rear panel. The apertures are provided for the passage of the legs of an infant within the infant seat.

Provided last are small generally vertical slits. The slits are provided in the front panel. The slits are provided for the passage of the seat belt for the removable retention of an infant within the infant seat.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved infant seat with a shopping cart system which has all of the advantages of the prior art shopping carts and seats of known designs and configurations and none of the disadvantages.

It is another object of the present invention to provide a new and improved infant seat with a shopping cart system which may be easily and efficiently manufactured and marketed.

It is further an object of the present invention to provide a new and improved infant seat with a shopping cart system which is of durable and reliable constructions.

An even further object of the present invention is to provide a new and improved infant seat with a shopping cart system which is susceptible of a low cost of manufacture with regard to both materials and labor, and which accordingly is then susceptible of low prices of sale to the consuming public, thereby making such infant seat with a shopping cart system economically available to the buying public.

Even still another object of the present invention is to provide an infant seat with a shopping cart system for supporting an infant in a safe, sanitary and comfortable manner while grocery shopping.

Lastly, it is an object of the present invention to provide a new and improved infant seat with a shopping cart system. An infant seat includes base, front, rear, and side panels. A box-like region provides for the receipt of an infant. The box-like region is enclosed at its lower extent to form a lower periphery and at its upper extent to form an upper periphery. The upper periphery is greater than the lower periphery. A tubular hem is formed in the upper periphery. An elastic band is located within the hem. The upper periphery is rolled over into a scroll-like cross section to preclude an infant within the infant seat from touching the shopping cart. Large apertures are provided in the rear panel for the passage of the legs of an infant within the infant seat. Small vertical slits are provided in the front panel for the passage of the seat belt. The seat belt provides for the removable retention of an infant within the infant seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
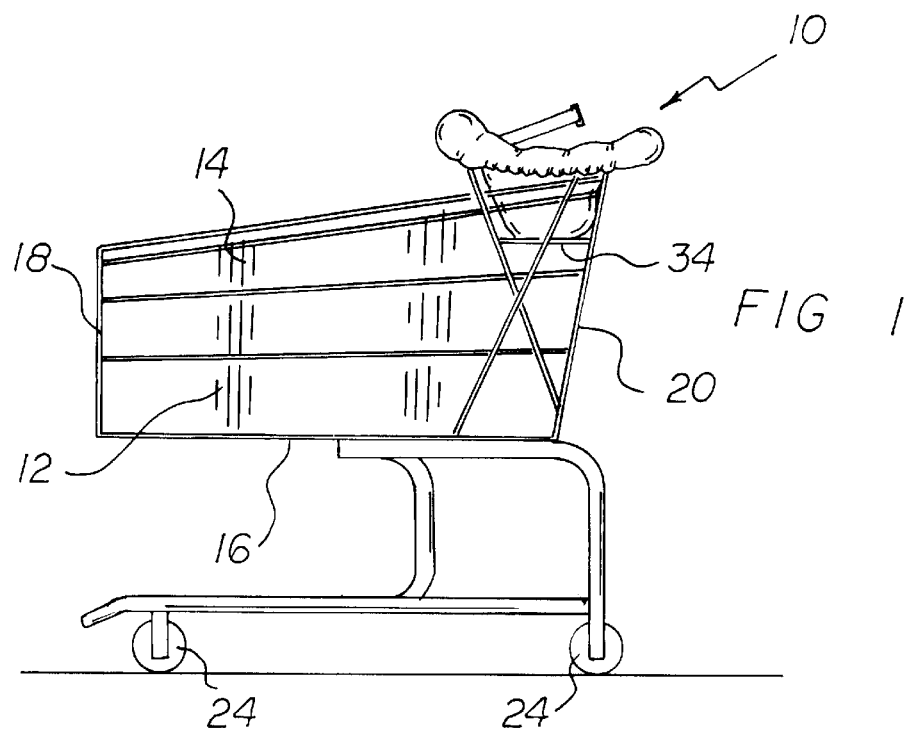
FIG. 1 is a side elevational view of an infant seat with a shopping cart system constructed in accordance with the principles of the present invention.
Figure 2:
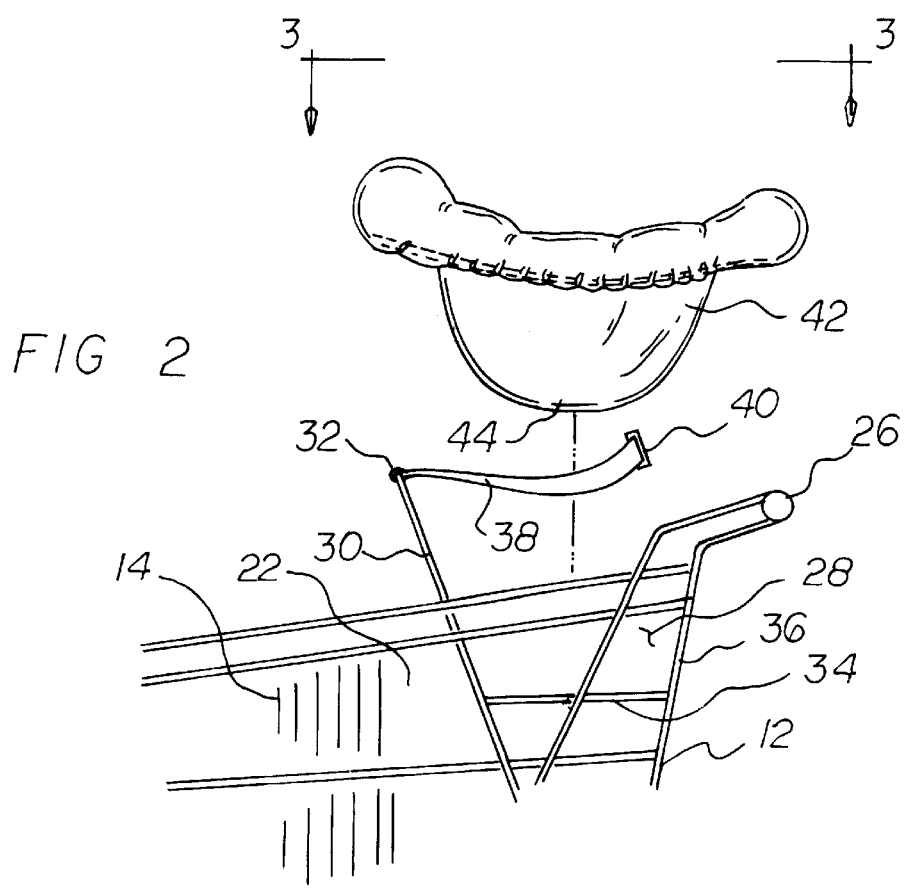
FIG. 2 is an enlarged exploded view of a portion of the system shown in FIG. 1.
Figure 3:
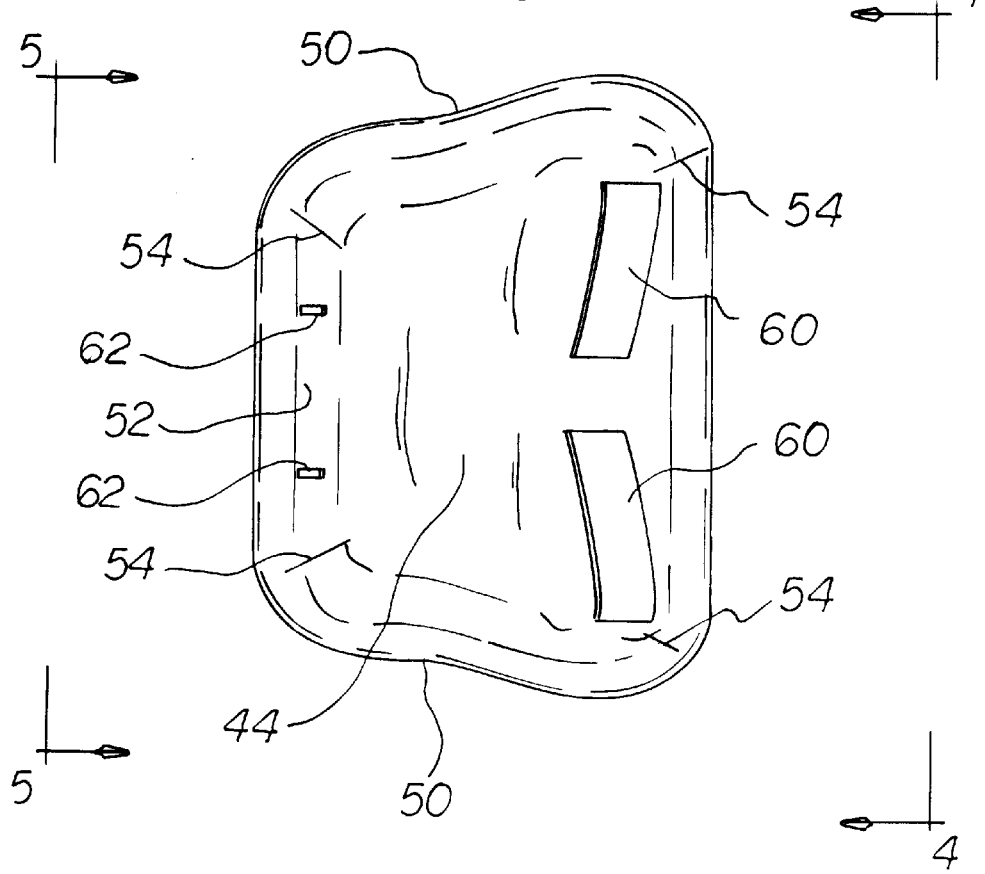
FIG. 3 is a plan view of the system taken along line 3—3 of FIG. 2.
Figure 4:
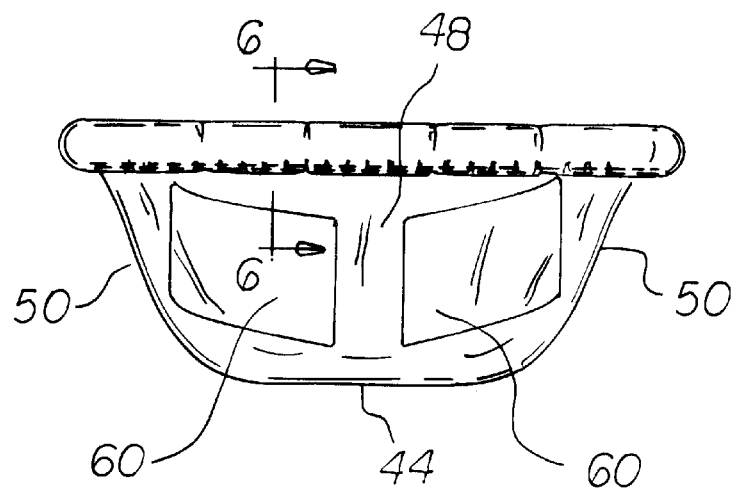
FIG. 4 is a front elevational view of the system taken along line 4—4 of FIG. 3.
Figure 5:
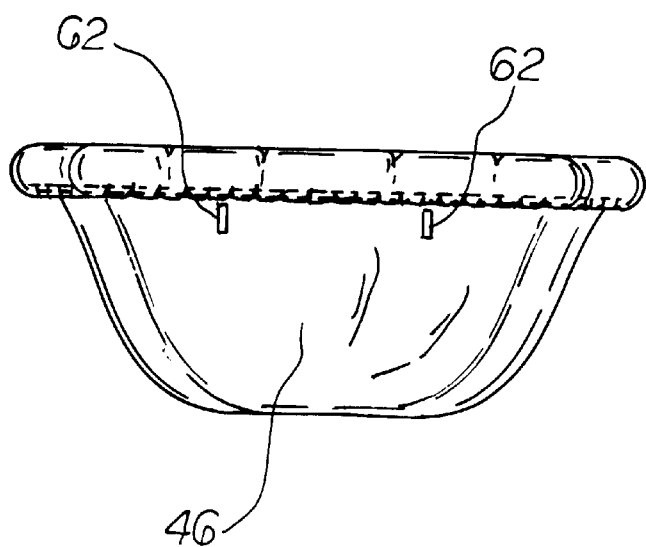
FIG. 5 is a rear elevational view of the system taken along line 5—5 of FIG. 3.
Figure 6:
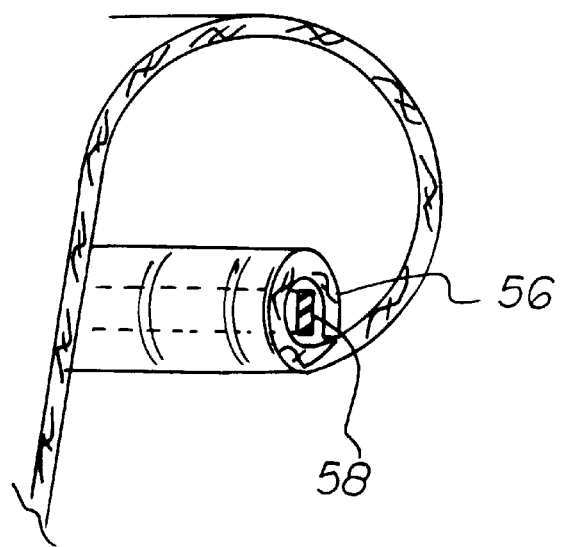
FIG. 6 is a cross sectional view of the system taken along line 6—6 of FIG. 4.

With reference now to the drawings, and in particular to FIG. 1 thereof, the preferred embodiment of the new and improved infant seat with a shopping cart system embodying the principles and concepts of the present invention and generally designated by the reference numeral 10 will be described.

The present invention, the infant seat with a shopping cart system 10 is comprised of a plurality of components. Such components in their broadest context include an infant seat, a tubular hem, large generally rectangular apertures, and small generally vertical slits. Such components are individually configured and correlated with respect to each other so as to attain the desired objective.

First provided is a shopping cart 12. The shopping care has a basket 14. The basket is for the receipt of groceries. The basket is fabricated of wire. The basket has an essentially horizontal floor 16. The floor of the basket has a narrow front face 18. The floor of the basket has a wide rear face 20. The floor of the basket has tapering sides 22 between the front and rear faces. The shopping care has wheels 24. The wheels are provided beneath the shopping cart. The shopping cart has a handle 26. The handle is provided above the shopping cart and adjacent to the rear face.

A sitting area 28 is provided in the basket. The sitting area is formed of a pivotable backrest 30. The sitting area has a top 32. The top is spaced a short distance from the rear face. The sitting area has a generally horizontal seat 34. The seat is provided between the backrest and the rear face. The sitting area is bounded on its side by the sides of the basket. The sitting area includes apertures 36. The apertures are provided in the back face above the seat. In this manner legs of an infant may pass within the sitting area. A seat belt 38 is provided. The seat belt is attached to the top of the backrest. The seat belt is attached with a buckle 40. In this manner an infant may be releasable retained with respect to the sitting area.

Provided next is an infant seat 42. The infant seat is fabricated of a soft quilted material. The seat includes a base panel 44. The base panel has a trapezoidal periphery. The base panel has a narrow front edge. The base panel has a wide rear edge. The base panel has tapering side edges between the front and rear edges. The seat includes a front panel 46. The seat also includes a rear panel 48. The seat further includes side panels 50 between the front and rear panels. The front, rear, and side panels have upper edges, lower edges, and side edges. The edges have generally horizontal stitching 52. The horizontal stitching couples the lower edges to the periphery of the base panel. The edges have generally vertical stitching 54. The vertical stitching couples together the side edges into a box-like region. In this manner an infant may be received. The box-like region is enclosed at its lower extent by the lower edges of the front and rear and side panels. In this manner a lower periphery is formed. The box-like region is enclosed at its upper extent by the upper edges of the front and rear and side panels. In this manner an upper periphery is formed. The upper periphery is greater than the lower periphery.

A tubular hem 56 is provided next. The tubular hem is formed in the upper periphery. The tubular hem is formed with an elastic band 58. The elastic band is located within the hem. The upper periphery is rolled over into a scroll-like cross section. The upper periphery is positioned generally above and exterior of the upper edges of the handle, the backrest, and the sides of the basket. In this manner an infant within the infant seat is precluded from touching the shopping cart.

Further provided are large generally rectangular apertures 60. The apertures are provided in the rear panel. The apertures are provided for the passage of the legs of an infant within the infant seat.

Provided last are small generally vertical slits 62. The slits are provided in the front panel. The slits are provided for the passage of the seat belt for the removable retention of an infant within the infant seat.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An infant seat with a shopping cart system to support an infant in a safe, sanitary and comfortable manner while grocery shopping comprising, in combination:

a shopping cart having a basket for the receipt of groceries, the basket being fabricated of wire and having an essentially horizontal floor with a narrow front face and a wide rear face and tapering sides there between, the shopping cart also having wheels there beneath and a handle there above adjacent to the rear face;

a sitting area in the basket, the sitting area being formed of a pivotable backrest with a top spaced a short distance from the rear face and with a generally horizontal seat between the backrest and the rear face, the sitting area being bounded on its side by the sides of the basket and further including apertures in the rear face above the seat for passage of legs of an infant sitting within the sitting area;

a seat belt attached to the top of the backrest with a buckle for the releasable retention of an infant with respect to the sitting area;

an infant seat fabricated of a soft quilted material, the seat including a base panel having a trapezoidal periphery with a narrow front edge and a wide rear edge and tapering side edges there between, the seat also including a front panel and a rear panel and side panels there between, the front and rear and side panels having upper edges and lower edges and side edges with generally horizontal stitching coupling the lower edges to the periphery of the base panel and generally vertical stitching coupling together the side edges to form a recess for receiving an infant, the recess being enclosed at its lower extent by the lower edges of the front and rear and side panels to form a lower periphery and the recess being enclosed at its upper extent by the upper edges of the front and rear and side panels to form an upper periphery, the upper periphery being greater than the lower periphery;

a tubular hem formed in the upper periphery with an elastic band located within the hem, the upper periphery being rolled over and having a round cross section and positioned generally above and exterior of the upper edges of the handle and the backrest and the sides of the basket to preclude an infant within the infant seat from touching the shopping cart;

large generally rectangular apertures in the rear panel for passage of the legs of an infant within the infant seat; and small generally vertical slits in the front panel for passage of the seat belt for the removable retention of an infant within the infant seat.

2. An infant seat with a shopping cart system comprising:

an infant seat including a base panel and a front panel, a rear panel and side panels and a recess for receiving an infant, the recess being enclosed at its lower extent by the lower edges of the front and rear and side panels to form a lower periphery and the recess being enclosed at its upper extent by the upper edges of the front and rear and side panels to form an upper periphery, the upper periphery being greater than the lower periphery;

a hem formed in the upper periphery with an elastic band located within the hem, the upper periphery being rolled over into a round cross section to preclude an infant within the infant seat from touching the shopping cart;

large generally rectangular apertures in the rear panel for passage of the legs of an infant within the infant seat; and small generally vertical slits in the front panel for passage of a seat belt for the removable retention of an infant within the infant seat.

3. The system as set forth in claim 2 and further including said hem being a tubular hem, the upper periphery being rolled over and having a round cross section to preclude an infant within the infant seat from touching the shopping cart.

4. The system as set forth in claim 2 wherein the infant seat is fabricated of a soft quilted material.

5. The system as set forth in claim 2 and further including said shopping cart having a basket having an essentially horizontal floor with a front face and a rear face and sides there between, the shopping cart also having wheels there beneath and a handle there above adjacent to the rear face;

a sitting area in the basket formed of a pivotable backrest with a top spaced a short distance from the rear face and with a generally horizontal seat between the backrest and the rear face, the sitting area being bounded on its side by the sides of the basket and further including apertures in the rear face above the seat; and a seat belt attached to the top of the backrest with a buckle for the releasable retention of an infant with respect to the sitting area.

* * * * *